US011366226B2

(12) United States Patent
Wang

(10) Patent No.: US 11,366,226 B2
(45) Date of Patent: *Jun. 21, 2022

(54) TIME-RESOLVING SENSOR USING SPAD + PPD OR CAPACITORS IN PIXEL FOR RANGE MEASUREMENT

(71) Applicant: Samsung Electronics Co., Ltd., Suwon-si (KR)

(72) Inventor: Yibing Michelle Wang, Pasadena, CA (US)

(73) Assignee: SAMSUNG ELECTRONICS CO., LTD.

(*) Notice: Subject to any disclaimer, the term of this patent is extended or adjusted under 35 U.S.C. 154(b) by 0 days.

This patent is subject to a terminal disclaimer.

(21) Appl. No.: 17/015,058

(22) Filed: Sep. 8, 2020

(65) Prior Publication Data

US 2020/0400794 A1 Dec. 24, 2020

Related U.S. Application Data

(63) Continuation of application No. 16/714,670, filed on Dec. 13, 2019, now Pat. No. 10,802,118, which is a
(Continued)

(51) Int. Cl.
*G01S 17/10* (2020.01)
*G01S 7/4865* (2020.01)
(Continued)

(52) U.S. Cl.
CPC ............ *G01S 17/10* (2013.01); *G01S 7/4863* (2013.01); *G01S 7/4865* (2013.01); *G01S 17/89* (2013.01); *G01S 17/894* (2020.01)

(58) Field of Classification Search
CPC .......... G01S 17/10; G01S 17/08; G01S 17/89; G01S 17/894; G01S 17/88; G01S 7/4863;
(Continued)

(56) References Cited

U.S. PATENT DOCUMENTS 8,514,284 B2 8/2013 Byren et al.
8,642,938 B2 2/2014 Bikumandla et al.
(Continued)

OTHER PUBLICATIONS

Notice of Allowance for U.S. Appl. No. 15/878,392, dated Sep. 3, 2019.
(Continued)

*Primary Examiner* — John R Lee
(74) *Attorney, Agent, or Firm* — Renaissance IP Law Group LLP

(57) ABSTRACT

A time-resolving sensor includes a single-photon avalanche diode (SPAD), a logic circuit and differential time-to-charge converter (DTCC) circuit. The SPAD is responsive to a shutter signal to generate an output signal based on detecting an incident photon. The logic circuit generates first and second enable signals. The DTCC includes a capacitor device, first and second switching devices, and an output circuit. The first switching device is responsive to the first enable signal to transfer a charge on the capacitor device to the first floating diffusion. The second switching device is responsive to the second enable signal to transfer a remaining charge on the capacitor device to the second floating diffusion. The output circuit outputs a first voltage that is based on the first charge on the first floating diffusion and a second voltage that is based on the second charge on the second floating diffusion.

14 Claims, 8 Drawing Sheets

Related U.S. Application Data continuation of application No. 15/878,392, filed on Jan. 23, 2018, now Pat. No. 10,545,224.

(60) Provisional application No. 62/595,508, filed on Dec. 6, 2017.

(51) Int. Cl.
    *G01S 7/4863* (2020.01)
    *G01S 17/89* (2020.01)
    *G01S 17/894* (2020.01)

(58) Field of Classification Search
    CPC ... G01S 7/486; G01S 7/4861; H04N 5/36961; H04N 5/36965; H04N 5/3696; H04N 5/37455; H04N 5/378; H04N 13/254
    See application file for complete search history.

(56) References Cited

U.S. PATENT DOCUMENTS

| | | | |
|---|---|---|---|
| 9,182,490 | B2 | 11/2015 | Velichko et al. |
| 9,425,233 | B2 | 8/2016 | Wan et al. |
| 9,621,860 | B2 | 4/2017 | Saito |
| 9,677,931 | B2 | 6/2017 | Shaber |
| 10,116,925 | B1 | 10/2018 | Wang et al. |
| 10,397,554 | B2 | 8/2019 | Wang |
| 10,545,224 | B2 | 1/2020 | Wang |
| 10,802,118 | B2 * | 10/2020 | Wang .............. G01S 17/10 |
| 2007/0182949 | A1 | 8/2007 | Niclass |
| 2011/0058153 | A1 | 3/2011 | Nieuwenhove et al. |
| 2012/0075615 | A1 | 3/2012 | Niclass et al. |
| 2013/0193546 | A1 | 8/2013 | Webster et al. |
| 2014/0000364 | A1 | 1/2014 | Choi et al. |
| 2014/0124652 | A1 | 5/2014 | Dutton et al. |
| 2014/0124653 | A1 | 5/2014 | Dutton et al. |
| 2016/0010986 | A1 | 1/2016 | Sun et al. |
| 2016/0240579 | A1 | 8/2016 | Sun et al. |
| 2017/0030769 | A1 | 2/2017 | Clemens et al. |
| 2017/0097417 | A1 | 4/2017 | Wang |
| 2018/0038945 | A1 | 2/2018 | Zhuang et al. |
| 2018/0045816 | A1 | 2/2018 | Jarosinski et al. |
| 2018/0128921 | A1 | 5/2018 | Rocca et al. |
| 2018/0156896 | A1 | 6/2018 | O'Keeffe |
| 2018/0176492 | A1 | 6/2018 | Bamji et al. |
| 2018/0217261 | A1 | 8/2018 | Wang |
| 2018/0306909 | A1 | 10/2018 | Seliuchenko |
| 2018/0338127 | A1 | 11/2018 | Wang et al. |
| 2019/0020864 | A1 | 1/2019 | Wang et al. |
| 2019/0170864 | A1 | 6/2019 | Wang |
| 2019/0174120 | A1 | 6/2019 | Wang |
| 2020/0400794 | A1 * | 12/2020 | Wang .............. G01S 17/10 |

OTHER PUBLICATIONS

Notice of Allowance for U.S. Appl. No. 16/714,670, dated Jun. 1, 2020.
Office Action for U.S. Appl. No. 15/878,392, dated Jun. 21, 2019.
Office Action for U.S. Appl. No. 16/714,670, dated Feb. 19, 2020.

* cited by examiner

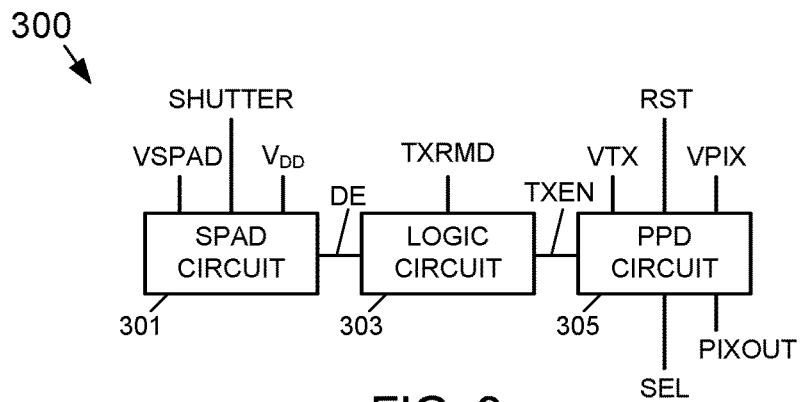
FIG. 3
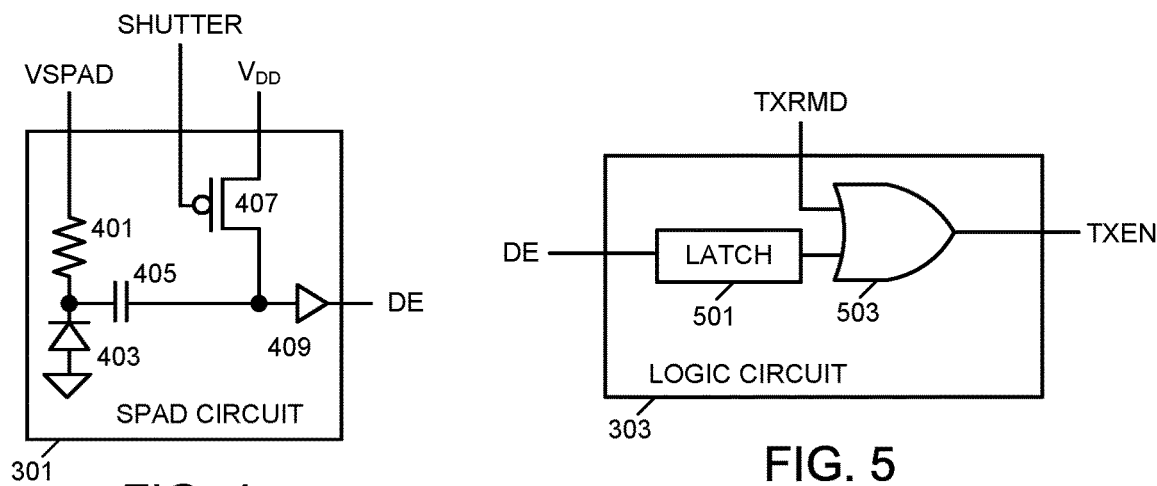
FIG. 4
FIG. 5
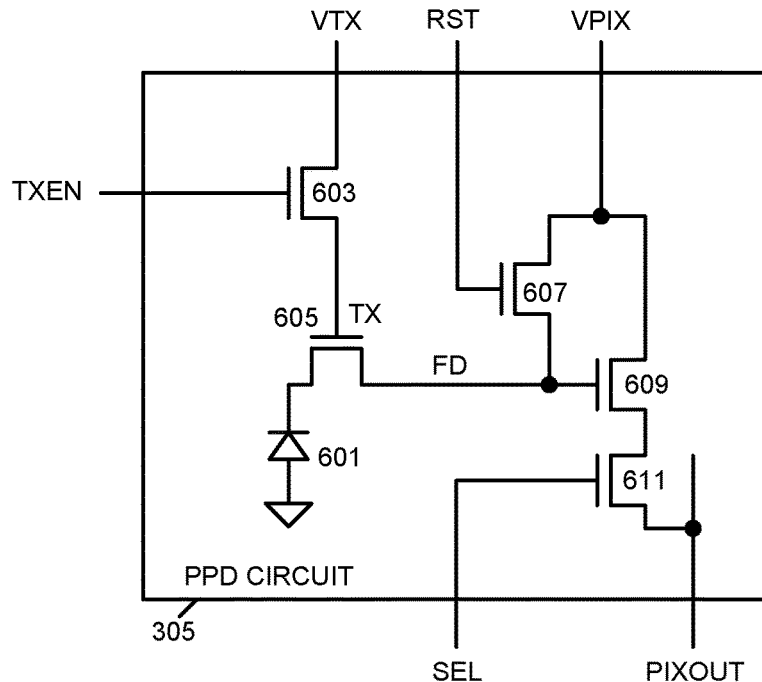
FIG. 6

TIME-RESOLVING SENSOR USING SPAD + PPD OR CAPACITORS IN PIXEL FOR RANGE MEASUREMENT

CROSS-REFERENCE TO RELATED APPLICATIONS

This patent application is a continuation of U.S. patent application Ser. No. 16/714,670, filed on Dec. 13, 2019, which is a continuation of U.S. patent application Ser. No. 15/878,392, filed on Jan. 23, 2018, which claims the priority benefit under 35 U.S.C. § 119(e) of U.S. Provisional Patent Application No. 62/595,508, filed on Dec. 6, 2017, the disclosures of which are incorporated herein by reference in their entirety.

TECHNICAL FIELD

The subject matter disclosed herein generally relates to an apparatus and a method for range measurement and, more particularly, to an apparatus and a method for direct time-of-flight (TOF) range measurement.

BACKGROUND

Three-dimensional (3D) imaging systems are increasingly being used in a wide variety of applications, such as high-speed 3D-imaging systems for advanced driver-assistant systems (ADAS), and high-speed 3D-imaging systems for autonomous navigation. Existing 3D-imaging technologies may, for example, utilize TOF-based range imaging, stereo-vision systems, and/or structured-light techniques.

In a TOF technique, range (or distance) to a 3D object may be resolved based on the known speed of light and by measuring the round-trip time it takes for a laser pulse or a light pulse to travel between a camera and the 3D object. A TOF camera may use a scannerless approach to capture an entire scene with each laser pulse or light pulse. Some examples TOF applications include advanced automotive applications, such as active pedestrian safety or precrash detection based on real time distance images to track movements of humans, objects or other vehicles; interaction with games on video game consoles; and industrial machine vision to classify objects and help robots find, for example, items on a conveyor belt. TOF-based systems that use a single-photon avalanche diode (SPAD) sensor may have low spatial resolution, low fill factor, and high power consumption if a time-to-digital counter (TDC) is placed inside each pixel. Moreover, using a differential time-to-charge converter (DTCC) as part of the sensor may result in a low range accuracy.

Stereoscopic-imaging or stereo-vision systems use two cameras that are displaced horizontally from each other to obtain two differing views of a scene or of a 3D object in the scene. By comparing the two images, relative depth information may be obtained for the 3D object. Stereo vision is highly important in fields, such as robotics, to extract information about the relative position of 3D objects in the vicinity of autonomous systems and robots. Other applications that may use robotic stereoscopic imaging include object recognition in which stereoscopic depth information allows a robotic system to separate occluding image components that the robot may otherwise not be able to distinguish as two separate objects. For example, a robot using stereo vision may not be able to distinguish two objects if one object is in front of a second object, thereby partially or fully hiding the second other object. Three-dimensional stereo displays are also used in entertainment and automated systems.

A structured-light (SL) technique measures a 3D shape of an object by using projected light patterns and an imaging camera. A known pattern of light, such as a grid, horizontal bars or other patterns of parallel stripes, may be projected onto a scene or a 3D object in the scene, and the projected pattern may become deformed or displaced as it strikes the surface of the 3D object. Such a deformation may allow an SL vision system to determine the depth and surface information of the object. That is, projecting a narrow band of light onto a 3D surface may produce a line of illumination that may appear distorted from a perspective that is different from the perspective of the projector. The distortion may be used for a geometric reconstruction of the illuminated surface of the 3D object. SL-based 3D imaging techniques may be used in different applications, such as photographing fingerprints in a 3D scene, inline inspection of components during a production process, and in a health-care environment to obtain live measurements of human body shapes or the micro structures of human skin.

SUMMARY

An example embodiment provides a time-resolving sensor that may include at least one single-photon avalanche diode (SPAD), a logic circuit, and a differential time-to-charge converter (DTCC) circuit. Each SPAD may be responsive to an active shutter signal to generate an output signal based on detecting one or more photons that are incident on the SPAD in which the one or more photons have been reflected from an object. The logic circuit may be coupled to the output signal of the at least one SPAD. The logic circuit may generate a first enable signal and a second enable signal. The first enable signal may be active in response to a beginning of the active shutter signal and may be inactive in response to the output signal of the at least one SPAD. The second enable signal may be in active in response to the output signal of the at least one SPAD and may be inactive in response to an end of the active shutter signal. The DTCC circuit may be coupled to the first and second enable signals. The DTCC circuit may include a capacitor, a first switching device, a second switching device and an output circuit. The capacitor device may have a first terminal and a second terminal in which the second terminal may be coupled to a ground voltage. The first switching device may have first, second and third terminals in which the first terminal of the first switching device may be coupled to the first terminal of the capacitor device, the second terminal of the first switching device may be coupled to a first floating diffusion, and the third terminal of the first switching device may be coupled to the first enable signal. The first switching device may be responsive to the first enable signal to transfer a first charge on the capacitor device to the first floating diffusion. The second switching device may have first, second and third terminals in which the first terminal of the second switching device may be coupled to the first terminal of the capacitor device, the second terminal of the second switching device may be coupled to a second floating diffusion, and the third terminal of the second switching device may be coupled to the second enable signal. The second switching device may be responsive to the second enable signal to transfer a remaining charge on the capacitor device to the second floating diffusion. The output circuit may output a first voltage that is based on the first charge on the first floating diffusion and a second voltage that is based on the remaining charge on the second floating diffusion. A first ratio of the first voltage to a sum of the first voltage and the second voltage may be proportional to a time of flight of the one or more detected photons, and a second ratio of the second voltage to the sum of the first voltage and the second voltage may be proportional to the time of flight of the one or more detected photons.

Another example embodiment provides a three-dimensional (3D) imaging system that may include an array of SPADs, at least one logic circuit, and at least one time-resolving sensor. Each SPAD may be responsive to an active shutter signal to generate an output signal based on detecting one or more photons that are incident on the SPAD in which the one or more photons have been reflected from an object. Each logic circuit may be coupled to the output signal of at least one SPAD and may generate a first enable signal and a second enable signal. The first enable signal may be active in response to a beginning of the active shutter signal and may be inactive in response to the output signal of the at least one SPAD. The second enable signal may be in active in response to the output signal of the at least one SPAD and may be inactive in response to an end of the active shutter signal. Each time-resolving sensor may include a DTCC circuit that may be coupled to the first and second enable signals of a corresponding logic circuit. The DTCC circuit may include a capacitor device, a first switching device, a second switching device and an output circuit. The capacitor device may have a first terminal and a second terminal in which the second terminal being coupled to a ground voltage. The first switching device may have first, second and third terminals in which the first terminal of the first switching device may be coupled to the first terminal of the capacitor device, the second terminal of the first switching device may be coupled to a first floating diffusion, and the third terminal of the first switching device may be coupled to the first enable signal. The first switching device may be responsive to the first enable signal to transfer a first charge on the capacitor device to the first floating diffusion. The second switching device may have first, second and third terminals in which the first terminal of the second switching device may be coupled to the first terminal of the capacitor device, the second terminal of the second switching device may be coupled to a second floating diffusion, and the third terminal of the second switching device may be coupled to the second enable signal. The second switching device may be responsive to the second enable signal to transfer a remaining charge on the capacitor device to the second floating diffusion. The output circuit may output a first voltage that is based on the first charge on the first floating diffusion and a second voltage that is based on the remaining charge on the second floating diffusion. A first ratio of the first voltage to a sum of the first voltage and the second voltage may be proportional to a time of flight of the one or more photons, and a second ratio of the second voltage to the sum of the first voltage and the second voltage may be proportional to the time of flight of the one or more photons.

Still another example embodiment provides a method to resolve time that may include generating an active shutter signal; detecting at at least one SPAD one or more photons that are incident on the at least one SPAD during the active shutter signal, the one or more photons being reflected from an object; generating an output signal based on the one or more photons; generating a first enable signal and a second enable signal based on the output signal, the first enable signal being active in response to a beginning of the active shutter signal and being inactive in response to the output signal, and the second enable signal being active in response to the output signal and being inactive in response to an end of the active shutter signal; transferring a charge on a capacitor device to a first floating diffusion to form a first charge on the first floating diffusion if the first enable signal is active; transferring a remaining charge on the capacitor device to a second floating diffusion to form a second charge on the second floating diffusion if the second enable signal is active; and outputting a first voltage based on the first charge and the second voltage based on the second charge, a first ratio of the first voltage to a sum of the first voltage and the second voltage being proportional to a time of flight of the one or more photons, and a second ratio of the second voltage to the sum of the first voltage and the second voltage being proportional to the time of flight of the one or more photons.

BRIEF DESCRIPTION OF THE DRAWINGS

In the following section, the aspects of the subject matter disclosed herein will be described with reference to exemplary embodiments illustrated in the figures, in which:

FIG. 3 depicts a block diagram of an example embodiment of a time-resolving sensor according to the subject matter disclosed herein;

FIG. 4 depicts a schematic diagram of an example embodiment of the SPAD circuit of the time-resolving sensor of FIG. 3 according to the subject matter disclosed herein;

FIG. 5 depicts a schematic diagram of an example embodiment the logic circuit of the time-resolving sensor of FIG. 3 according to the subject matter disclosed herein;

FIG. 6 depicts a schematic diagram of an example embodiment of the PPD circuit of the time-resolving sensor of FIG. 3 according to the subject matter disclosed herein;

DETAILED DESCRIPTION

Figure 1:
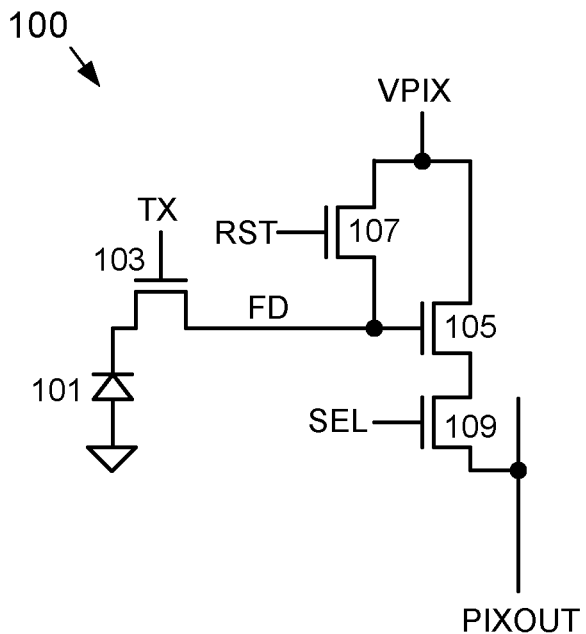
FIG. 1 depicts a schematic diagram of an exemplary embodiment of a four-transistor PPD pixel cell according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

One example embodiment of the subject matter disclosed herein may be used to provide an improved vision for drivers under difficult conditions, such as, but not limited to, low light, bad weather, or strong ambient light, and provides an improvement to the performance of an autonomous navigation system by combining a single-photon avalanche diode (SPAD) circuit, a logic circuit, and a pinned photodiode (PPD) circuit in a pixel of an time-of-flight system. Such a system may provide range measurements that are based on a controlled charge transferring, photon counting and a single-ended-to-differential time-to charge conversion. In one embodiment, the PPD circuit may include more than one transfer gate and more than one storage node.

In one embodiment, the subject matter disclosed herein provides a time-resolving sensor that does not exhibit range measurement errors that may be caused by variations in the slope of a VTX signal or that may be caused by variations in capacitance of the PPD from pixel-to-pixel in the time-resolving sensor.

FIG. 1 depicts a schematic diagram of an exemplary embodiment of a four-transistor PPD pixel cell 100 according to the subject matter disclosed herein. The four-transistor PPD pixel cell 100 may include a PPD 101, a first transistor 103, a second transistor 105, a third transistor 107, and a fourth transistor 109. The PPD 101 may include an anode connected to a ground potential and a cathode. The PPD 101 may store a charge in a manner that is similar to a capacitor. In one embodiment, the PPD 101 may be covered so that it does not respond to light, and may be used as a time-to-charge converter instead of a light-sensing element.

The first transistor 103 may include a first source/drain (S/D) terminal connected to the cathode of the PPD 101, a gate terminal that may receive a TX signal for transferring charge from the PPD 101, and a second S/D terminal to which charge from the PPD 101 may be transferred. In one embodiment, the charge that may be transferred may be electrons. In another example embodiment, a PPD having a different design may be used in which the charge transferred may be holes.

The second transistor 105 may include a first S/D terminal for receiving a VPIX voltage for the pixel, a gate terminal connected to the second S/D terminal of the first transistor 103, and a second S/D terminal. The conductive path between the gate terminal of the second transistor 105 and the second S/D terminal of the first transistor 103 may be a floating diffusion FD node. The second transistor 105 may operate to convert a charge on stored on the FD node to a voltage at the second S/D terminal of the second transistor 105.

The charge that may be transferred to the FD node from the PPD 101 may be modulated by the TX signal. In one embodiment, a VTX signal may be applied as the TX signal in which the VTX signal may have a ramped shape that increasingly transfers charge on the PPD 101 to the FD node. The amount of charge transferred from the PPD 101 to the FD node may be a function of the voltage level of the VTX signal, and the ramping of the VTX voltage may be a function of time. Thus, the charge transferred from the PPD 101 to the FD node may also be a function of time. If, during the transfer of charge from the PPD 101 to the FD node, the first transistor 103 is turned off in response to, for example, detection of an incoming photon, the transfer of charge from the PPD 101 to the FD node stops. The more charge transferred to the FD node results in a greater voltage decrease on the FD node and a corresponding increase in voltage on the PPD 101. The amount of charge transferred to the FD node and the amount of charge remaining on the PPD 101 may both be a function of the TOF of the incoming photons. The transfer of charge from the PPD 101 to the FD node based on the VTX signal and detection of incoming photos provides may be considered to be a single-ended-to-differential conversion of charge to time.

The third transistor 107 may include a first S/D terminal for receiving the VPIX voltage for the pixel, a gate terminal for receiving an RST signal for resetting the charge level of the FD node, and a second S/D terminal connected to the FD node and to the second S/D terminal of the first transistor 103.

The fourth transistor 109 may include a first S/D terminal connected to the second S/D terminal of the second transistor 105, a gate terminal for receiving an SEL signal, and a second S/D terminal connected to a pixel output PIXOUT data line. The SEL signal is used to select the pixel to readout either a voltage corresponding to the charge that has been transferred to the FD node as a PIXOUT1 signal or, subsequently, a PIXOUT2 signal that is a voltage corresponding to the charge remaining in the PPD 101 after the remaining charge in the PPD 101 has been transferred to the FD node as a PIXOUT2 signal. In one embodiment, a ratio of the PIXOUT1 signal to the sum of the PIXOUT1 signal plus the PIXOUT2 signal is proportional to the difference between the TOF of a light signal received by the pixel and a delay time. That is, $$\left(\frac{PIXOUT1}{PIXOUT1 + PIXOUT2}\right) \propto T_{tof} - T_{dly}, \qquad (1)$$

The ratio expressed in Eq. (1) may be used to determine depth or range of an object, and may be less sensitive to measurement-to-measurement variations if PIXOUT1+PIXOUT2 does not vary from measurement to measurement.

In one embodiment, the first transistor 103, the second transistor 105, the third transistor 107, and the fourth transistor 109 may each be one of an n-channel metal-oxide semiconductor field effect transistor (n-type MOSFET) or a p-channel metal-oxide semiconductor field effect transistor (p-type MOSFET). The embodiments disclosed herein are, however, not limited to using n-type MOSFETs or p-type MOSFETs because any other suitable transistor may be used.

Figure 2:
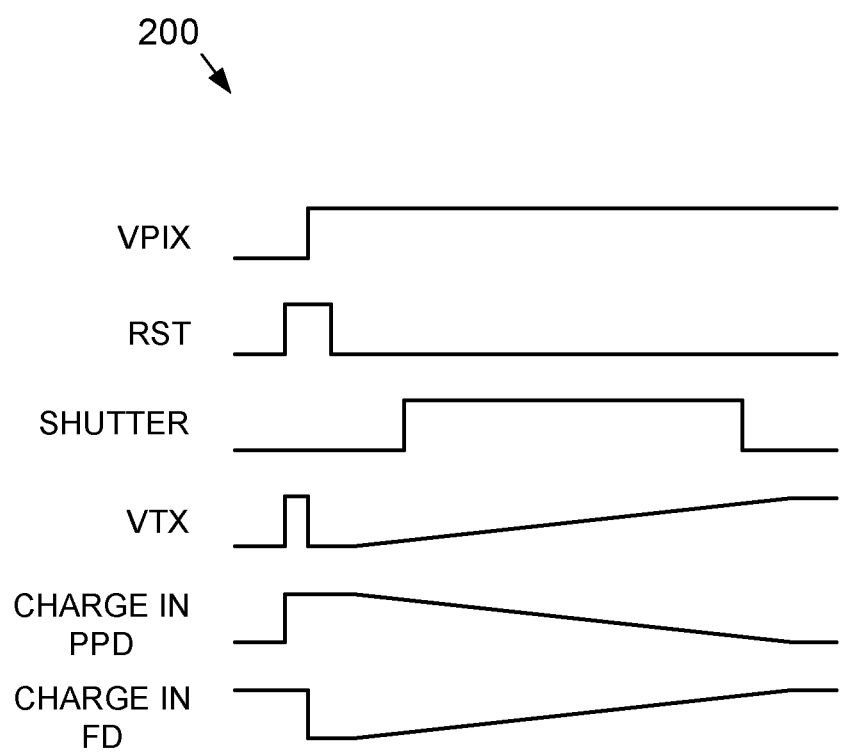
FIG. 2 depicts an example signal timing diagram for the PPD pixel cell depicted in FIG. 1 according to the subject matter disclosed herein.

FIG. 2 depicts an example relative signal timing diagram 200 for the PPD pixel cell 100 depicted in FIG. 1 according to the subject matter disclosed herein. In FIG. 2, the VPIX signal may start as a low logic voltage (logic 0 or 0 V) to initialize the PPD pixel cell 100 and may later switch to a high logic voltage (logic 1 or 3V) during operation of the PPD pixel cell 100. The RST signal may go from logic 0 to logic 1 and back to logic 0 during the initialization of the PPD pixel cell 100 to set the charge in the FD node to 0 Coulombs, and to set the charge in the PPD 101 to its full-well capacity (although the circuitry for setting the charge in the PPD 101 is not depicted in FIG. 1).

During a range measurement operation, a SHUTTER signal goes active high and the VTX signal begins ramping up. The time that the SHUTTER signal may become active high may correspond to the minimum measurement range for the PPD pixel cell 100 to receive a photon (a photon detection event) that has been reflected off of an object.

After initialization, the PPD 101 starts out fully charged ("Charge in PPD" signal in FIG. 2) and as the VTX signal ramps linearly upward from 0 V, the charge on the PPD 101 transfers to the FD node. When a photo detection event occurs, the SHUTTER signal becomes inactive and the VTX signal applied to the first transistor 101 at a TX signal becomes inactive. (It should be noted that the SHUTTER signal and the VTX signal may also become inactive at a time that corresponds to the maximum range of the TOF sensor). The amount of charge that has been transferred from the PPD 101 to the FD node is a function of how long the VTX signal had been applied to the gate of the first transistor 101. The more electrons transferred to the FD node from the PPD 101, the lower the voltage on the FD node becomes, as indicated by the "Charge on the FD" signal in FIG. 2.

In one embodiment, the VTX signal may ideally be linear, and may ideally be uniform throughout the different pixels of a TOF pixel array. In practice, however, the VTX signal that may be applied to the different pixels of a TOF pixel array may vary from pixel to pixel, thereby introducing an error in a range measurement that depends on the variation of the VTX signal on a pixel-to-pixel basis, and may also vary from on a measurement-to-measurement basis.

FIG. 3 depicts a block diagram of an example embodiment of a time-resolving sensor 300 according to the subject matter disclosed herein. The time-resolving sensor 300 may include a SPAD circuit 301, a logic circuit 303, and a PPD circuit 305.

The SPAD circuit 301 may include a SPAD for detecting photons, a first input for receiving a VSPAD voltage, a second input for receiving a SHUTTER signal for controlling opening and closing an electronic shutter, a third input for receiving a $V_{DD}$ voltage, and an output for outputting a detection event (DE) signal. In response to receiving a photon, the SPAD circuit 301 outputs a pulse signal that goes rapidly from the VSPAD voltage to a voltage that is below the SPAD breakdown voltage and then more gradually returns to the VSPAD voltage.

The logic circuit 303 may include a first input connected to the DE signal output from the SPAD circuit 301, a second input for receiving a TXRMD signal for completely transferring a charge remaining in a PPD of the PPD circuit 305 to an FD node, and an output for outputting a TXEN signal.

The PPD circuit 305 may include a first input connected to the TXEN signal output from the logic circuit 303, a second input for receiving a VTX signal for partially or completely transferring charge from the PPD of the PPD circuit 305 to the FD node in the PPD circuit 305, a third input for receiving an RST signal for resetting the charge in the FD node and presetting the charge in the PPD, a fourth input for receiving a VPIX voltage for the PPD circuit 305, a fifth input for receiving an SEL signal for enabling read out of either a PIXOUT1 signal (representing the charge on the FD node) or a PIXOUT2 signal (representing the charge remaining in the PPD), and an PIXOUT output for outputting the PIXOUT1 signal and the PIXOUT2 signal in response to the SEL signal.

FIG. 4 depicts a schematic diagram of an example embodiment of the SPAD circuit 301 of the time-resolving sensor 300 according to the subject matter disclosed herein. In one embodiment, the SPAD circuit 301 may include a resistor 401, a SPAD 403, a capacitor 405, a p-type MOSFET transistor 407, and a buffer 409. The resistor 401 may include a first terminal for receiving the VSPAD voltage, and a second terminal. The SPAD 403 may include an anode connected to a ground potential, and a cathode connected to the second terminal of the resistor 401. In another embodiment, the positions of the resistor 401 and the SPAD 403 may be swapped. The SPAD 403 may respond to light. In response to receiving a photon, the SPAD 403 outputs a pulse signal that goes rapidly from the VSPAD voltage to below breakdown voltage, and then more gradually returns to the VSPAD voltage. In one example, the breakdown voltage may be a particular threshold voltage.

The capacitor 405 may include a first terminal connected to the cathode of the SPAD 403 and a second terminal. In an alternative embodiment, the capacitor 405 may be omitted. The p-type MOSFET 407 may include a first S/D terminal connected to the second terminal of the capacitor 405, a gate for receiving the SHUTTER signal, and a second S/D terminal for receiving the VPIX voltage ($V_{DD}$). The buffer 409 may include an input connected to the second terminal of the capacitor 405, and an output to output a DE signal. The DE signal may correspond to the DE output of the SPAD circuit 301. In an alternative embodiment, the buffer 409 may be an inverter.

FIG. 5 depicts a schematic diagram of an example embodiment the logic circuit 303 of the time-resolving sensor 300 according to the subject matter disclosed herein. The logic circuit 303 may include a latch 501 and a two-input OR gate 503.

The latch 501 may include an input connected to the DE signal output from the SPAD circuit 301 and an output. In response to the DE signal, the latch outputs a logic signal that, for example, goes from a logic 1 to a logic 0, and remains at logic 0. In other words, the latch 501 converts a pulse-type signal to a signal that goes from a logic 1 to a logic 0 and remains at logic 0 without returning to logic 1 until reset. The latch output may be triggered by the leading edge of the DE signal in which the leading edge may be positive going or negative going depending on the design of the SPAD circuit 301.

The two-input OR gate 503 may include a first input connected to the output of the latch 501, a second input for receiving the TXRMD signal, and an output to output a TXEN signal. The two input OR gate 503 performs a logical OR function and outputs the result as the TXEN signal. In particular, the output of the two-input OR gate 503 goes to a logic 1 if either a photon is received by the SPAD circuit 301 when SHUTTER is a logic 1, or if the TXRMD signal is a logic 1, which occurs when the remaining charge in the PPD of the PPD circuit 305 is to be transferred completely to the FD node for readout as a PIXOUT2 signal.

FIG. 6 depicts a schematic diagram of an example embodiment of the PPD circuit 305 of the time-resolving sensor 300 according to the subject matter disclosed herein. The PPD circuit 305 may include a PPD 601, a first transistor 603, a second transistor 605, a third transistor 607, a fourth transistor 609, and a fifth transistor 611.

The PPD 601 may include an anode connected to a ground potential and a cathode. The PPD 601 may store charge in a manner that is similar to a capacitor. In one embodiment, the PPD 601 may be covered and therefore does not respond to light, and may be used as a time-to-charge converter instead of a light-sensing element.

The first transistor 603 may include a gate terminal connected to the TXEN signal output of the logic circuit 303, a first S/D terminal for receiving the VTX signal, and a second S/D terminal. The first transistor 603 may receive the VTX signal and may enable the VTX signal to pass through the first transistor 603 under the control of TXEN signal to output a TX signal at the second S/D terminal of the first transistor 603.

The second transistor 605 may include a gate terminal connected to the second S/D terminal of the first transistor 603, a first S/D terminal connected to the cathode of the PPD 601, and a second S/D terminal. The second transistor 605 may receive the TX signal on the gate terminal and transfers the charge on the PPD 601 on the source terminal to the drain terminal, which is connected to the FD node. There may be a parasitic capacitance between the FD node and ground, which is not indicated in FIG. 6. In one embodiment, a physical capacitance may also be connected between the FD node and ground.

The third transistor 607 may include a gate terminal for receiving the RST signal, a first S/D terminal for receiving the VPIX voltage, and a second S/D terminal connected to the second S/D terminal of the second transistor 605.

The fourth transistor 609 may include a gate terminal connected to the second S/D terminal of the second transistor 605, a first S/D terminal connected to the first S/D terminal of the third transistor 607, and a second S/D terminal.

The fifth transistor 611 may include a gate terminal for receiving the SEL signal, a first S/D terminal connected to the second S/D terminal of the fourth transistor 609, and a second S/D terminal that is the PIXOUT output of the PPD circuit 305. The fifth transistor 611 may receive the SEL signal for selecting the pixel to readout either the charge in the FD node (as PIXOUT1) or the remaining charge in the PPD 601 (as PIXOUT2).

The charge transferred from the PPD 601 to the FD node is controlled by the TX signal. In one embodiment, a VTX signal is coupled through the first transistor 603 to become the TX signal. The VTX signal is ramped upwardly to increasingly transfer charge from the PPD 601 to the FD node. The amount of charge transferred from the PPD 601 to the FD node may be a function of the level of the TX signal, and the ramping of the TX signal may be a function of time. Thus, the charge transferred from the PPD 601 to the FD node may be a function of time. If, during the transfer of charge from the PPD 601 to the FD node, the second transistor 605 is turned off in response to the SPAD circuit 301 detecting an incoming photon, the transfer of charge from the PPD 601 to the FD node stops. The amount of charge transferred to the FD node and the amount of charge remaining in the PPD 601 may be both related to the TOF of the incoming photon. The transfer of charge from the PPD 601 to the FD node based on the TX signal and detection of incoming photos may be considered to provide is a single-ended-to-differential conversion of charge to time.

The fourth transistor 609 operates to convert a charge on stored on the FD node to a voltage at the second S/D terminal of the fourth transistor 609. The SEL signal is used to select the pixel to readout either a PIXOUT1 signal that corresponds to the charge that has been transferred to the FD node or, subsequently, a PIXOUT2 signal that corresponds to the charge remaining in the PPD 601 after the remaining charge in the PPD 601 has been transferred to the FD node. In one embodiment, a ratio of the PIXOUT1 signal to the sum of the PIXOUT1 signal plus the PIXOUT2 signal is proportional to the difference between the TOF of a light signal received by the pixel and a delay time, as expressed in the ratio of Eq. (1). In an embodiment in which the light pulse is transmitted after VTX starts to ramp upwardly, the delay time may be negative.

For the time-resolving sensor 300, the ratio expressed in Eq. (1) may be used to determine depth or range of an object, and is less sensitive to measurement-to-measurement variations if PIXOUT1+PIXOUT2 does not vary from measurement to measurement. In one embodiment, the VTX signal may ideally be linear, and may ideally be uniform throughout the different pixels of a TOF pixel array. In practice, however, the VTX signal that may be applied to the different pixels of a TOF pixel array may vary from pixel to pixel, thereby introducing an error in a range measurement that depends on the variation of the VTX signal from pixel to pixel, and may also vary from measurement-to-measurement.

In one embodiment, the first transistor 603, the second transistor 605, the third transistor 607, the fourth transistor 609, and the fifth transistor 611 may each be an n-type MOSFET or a p-type MOSFET. The subject matter disclosed herein is, however, not limited to using n-type MOSFETs or p-type MOSFETs because any other suitable transistor may be used.

Figure 7:
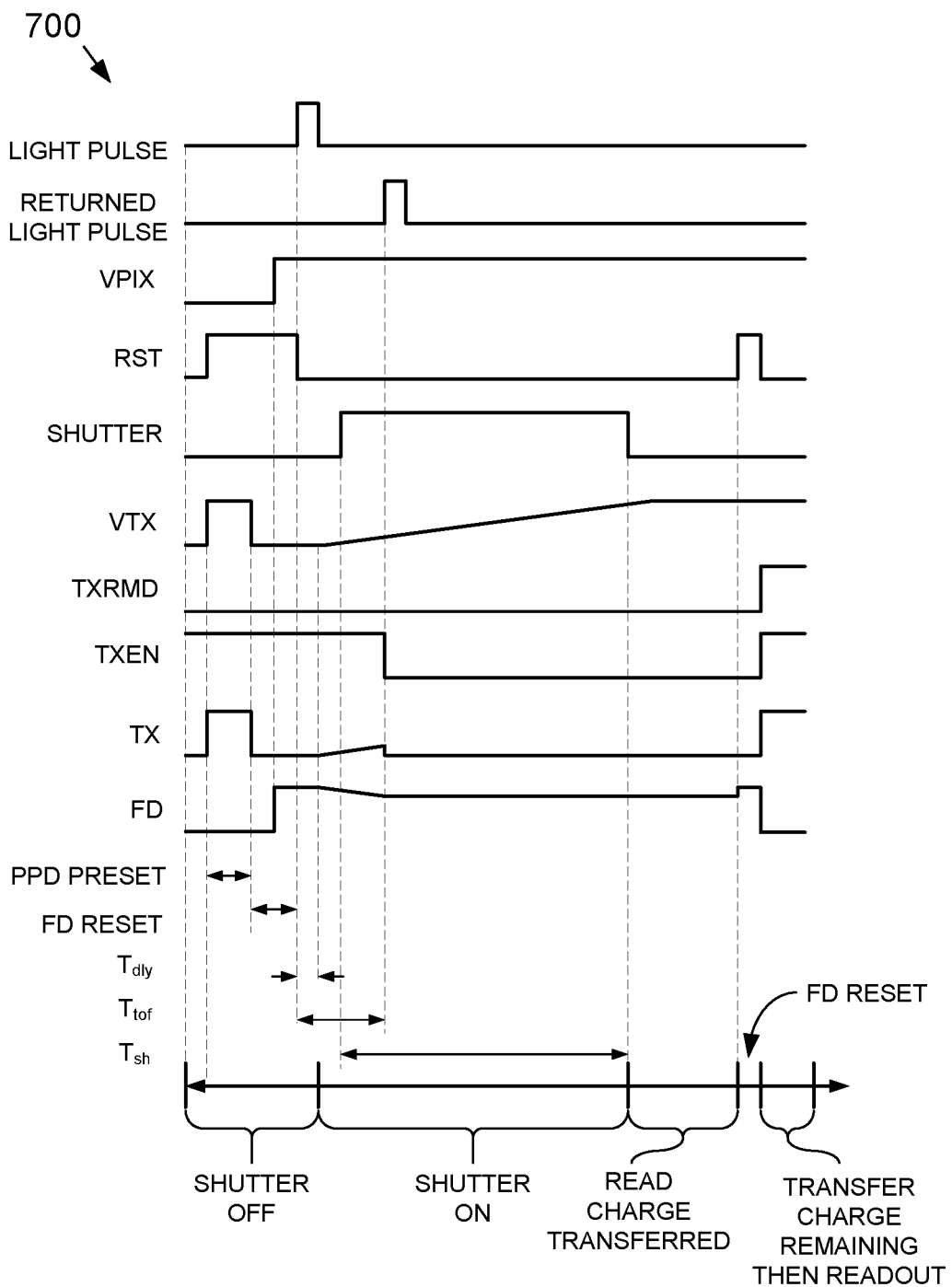
FIG. 7 depicts an example relative signal timing diagram for the time-resolving sensor of FIG. 3 according to the subject matter disclosed herein.

FIG. 7 depicts an example relative signal timing diagram 700 for the time-resolving sensor 300 of FIG. 3 according to the subject matter disclosed herein. In FIG. 7, during a Shutter Off (initialization) period, the RST signal, the VTX signal, and the TX signal each go high (logic 1), then return to 0 (logic 0) to reset the PPD circuit 305. The TXEN signal is high. The PPD 601 may be filled with charge to its full-well capacity at this initialization period. The VTX signal and the TX signal go low to turn off the second transistor 605 of the PPD circuit 305. The VPIX voltage goes high, thereby causing FD node to become reset. A light pulse is transmitted toward an object when the RST signal returns to 0 or shortly thereafter. The VTX signal then begins to ramp upwardly and the SHUTTER signal goes high starting a Shutter On period.

As the VTX signal ramps upwardly, the TX signal also ramps upwardly and the charge on the FD node begins to decrease in response to the TX signal. A returned light pulse causes the TXEN signal to go low (logic 0), thereby stopping the transfer of the charges between the FD node and the PPD 601.

The delay time $T_{dly}$ represents the time between the start of the transmitted light pulse to the time the signal TX starts to ramp upwardly. The time of flight $T_{tof}$ represents the time between the start of the transmitted light pulse to the time the returned signal is received. The electronic shutter time $T_{sh}$ represents the time from when the electronic shutter is opened to the time when the electronic shutter is closed (the shutter on period). In one embodiment, the electronic shutter time $T_{sh}$ may be less than or equal to the ramping time of the VTX signal.

The charge that has been transferred is read out as a PIXOUT1 signal during a Read Charge Transferred period. While the SHUTTER signal is low, the RST signal goes high a second time reset the charge on the FD node, then the TXRMD, the TXEN and the TX signals go high to transfer the remaining charge on the PPD 601 to the FD node for read out as a PIXOUT2 signal.

Figure 8:
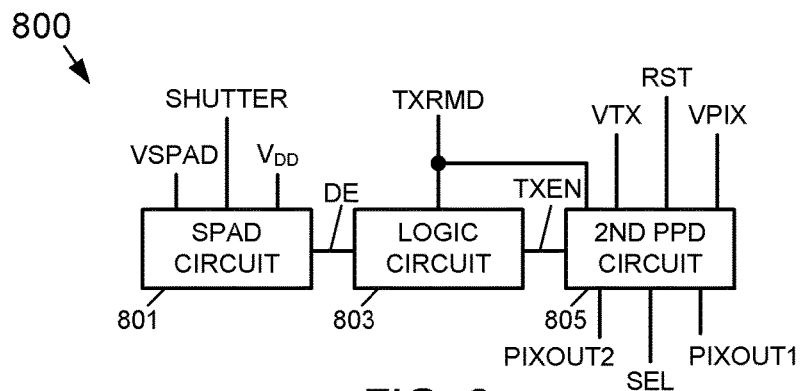
FIG. 8 depicts a block diagram of another example embodiment of a time-resolving sensor according to the subject matter disclosed herein.

FIG. 8 depicts a block diagram of another example embodiment of a time-resolving sensor 800 according to the subject matter disclosed herein. The time-resolving sensor 800 may include a SPAD circuit 801, a logic circuit 803, and a second PPD circuit 805.

The SPAD circuit 801 may include a SPAD for detecting photons, a first input for receiving a VSPAD voltage, a second input for receiving a SHUTTER signal for controlling opening and closing of an electronic shutter, a third input for receiving a VDD voltage (VDD), and an output for outputting a detection event DE signal. In response to receiving a photon, the SPAD circuit 801 outputs a pulse signal that goes rapidly from VSPAD to 0 and gradually back to VSPAD. In one embodiment, the SPAD circuit 801 may be the same as the SPAD circuit 301 depicted in FIG. 3.

The logic circuit 803 may include a first input connected to the DE output of the SPAD circuit 801, a second input for receiving a TXRMD signal for completely transferring charge remaining in a PPD of the second PPD circuit 805, and an output for outputting a TXEN signal. In one embodiment, the logic circuit 803 may be the same as the logic circuit 303 depicted in FIG. 3.

The second PPD circuit 805 may include a first input connected to the TXEN signal output from the logic circuit 803, a second input connected to the second input of the logic circuit 803 for receiving the TXRMD signal, a third input for receiving a VTX signal for transferring charge partially or completely from the PPD of the second PPD circuit 805 to a first floating diffusion node (FD1) in the second PPD circuit 805, a fourth input for receiving an RST signal for resetting the charge in FD1 node and presetting the charge in the PPD, a fifth input for receiving a VPIX voltage for the second PPD circuit 805, and a sixth input for receiving an SEL signal for enabling read out of either a PIXOUT1 signal corresponding to the charge on FD node1 on a PIXOUT1 output, and enabling read out of a PIXOUT2 signal corresponding to the charge remaining in the PPD of the second PPD circuit 805 on a PIXOUT2 output.

Figure 9:
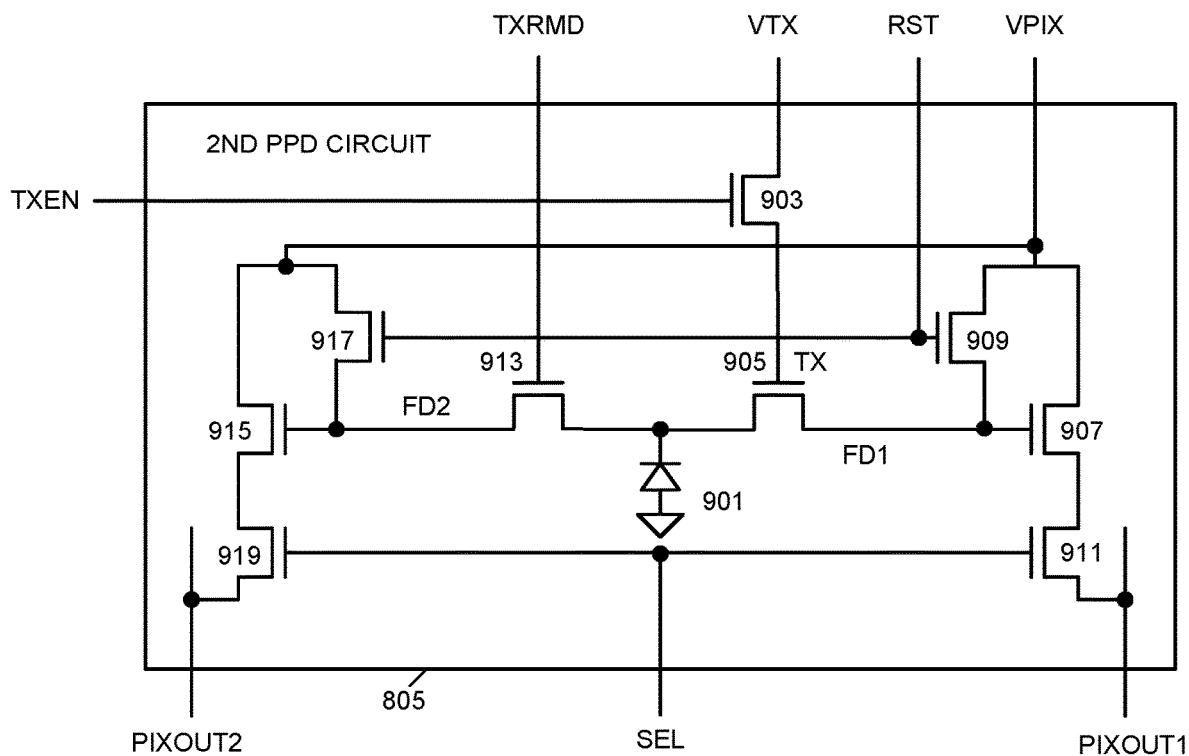
FIG. 9 depicts a schematic diagram of an example embodiment of the second PPD circuit of the time-resolving sensor of FIG. 8 according to the subject matter disclosed herein.

FIG. 9 depicts a schematic diagram of an example embodiment of the second PPD circuit 805 of the time-resolving sensor 800 according to the subject matter disclosed herein. The second PPD circuit 805 may include a PPD 901, a first transistor 903, a second transistor 905, a third transistor 907, a fourth transistor 909, a fifth transistor 911, a sixth transistor 913, a seventh transistor 915, an eighth transistor 917, and a ninth transistor 919.

The PPD 901 may include an anode connected to a ground potential, and a cathode. The PPD 901 may store charge in a manner similar to that of a capacitor. In one embodiment, the PPD 901 may be covered and therefore does not respond to light, and may be used as a time-to-charge converter instead of a light-sensing element.

The first transistor 903 may include a gate terminal connected to the output of the logic circuit 803 for receiving the TXEN output, a first S/D terminal for receiving the VTX voltage for controlling the transfer of charge from the PPD 901, and a second S/D terminal.

The second transistor 905 may include a gate terminal connected to the second S/D terminal of the first transistor 903 for receiving a TX signal for transferring charge from the PPD 901, a first S/D terminal connected to the cathode of the PPD 901, and a second S/D terminal connected to a first floating diffusion node FD1 to which charge is transferred from the PPD 901. The FD1 node may have a first capacitance. There may be a parasitic capacitance between the FD1 node and ground, which is not indicated in FIG. 9. In one embodiment, a physical capacitance may also be connected between the FD1 node and ground. The charge transferred from the PPD 901 to the FD1 node through the second transistor 905 is controlled by the TX signal.

The third transistor 907 may include a gate terminal connected to the FD1 node and to the second S/D terminal of the second transistor 905, a first S/D terminal for receiving the VPIX voltage, and a second S/D terminal. The third transistor 907 may operate to convert a charge on stored on the FD1 node to a voltage at the second S/D terminal of the third transistor 907.

The fourth transistor 909 may include a gate terminal for receiving the RST signal for setting the charge level of the FD1 node, a first S/D terminal for receiving the VPIX voltage, and a second S/D terminal connected to the second S/D terminal of the second transistor 905.

The fifth transistor 911 may include a gate terminal for receiving the SEL signal for reading out the charge on the FD1 node, a first S/D terminal connected to the second S/D terminal of the third transistor 907, and a second S/D terminal connected to a pixel output PIXOUT1 data line for outputting a voltage corresponding to the charge on the FD1 node as a PIXOUT1 signal.

The sixth transistor 913 may include a gate terminal for receiving the TXRMD signal for completely transferring charge remaining in the PPD 901 to a second floating diffusion node FD2, a first S/D terminal connected to the cathode of the PPD 901, and a second S/D terminal connected to the FD2 node. The FD2 node may have a second capacitance. There may be a parasitic capacitance between the FD2 node and ground, which is not indicated in FIG. 9. In one embodiment, a physical capacitance may also be connected between the FD2 node and ground. In one embodiment, the second capacitance of the FD2 node may be equal to the first capacitance of the FD1 node. Any remaining charge in the PPD 901 may be transferred through the sixth transistor 913 to the FD2 node.

The seventh transistor 915 may include a gate terminal connected to the second S/D terminal of the sixth transistor 913 and to the FD2 node, a first S/D terminal for receiving the VPIX voltage, and a second S/D terminal. The seventh transistor 915 may operate to convert a charge on stored on the FD2 node to a voltage at the second S/D terminal of the seventh transistor.

The eighth transistor 917 may include a gate terminal for receiving the RST signal for setting the charge level of the FD2 node, a first S/D terminal for receiving the VPIX signal, and a second S/D terminal connected to the source terminal of the sixth transistor 913.

The ninth transistor 919 may include a gate terminal for receiving the SEL signal for selecting the pixel to readout a voltage corresponding to the charge in the FD2 node, a first S/D terminal connected to the second S/D terminal of the seventh transistor 915, and a second S/D terminal connected to a pixel output PIXOUT2 data line for outputting a voltage corresponding to the charge on the FD2 node as a PIXOUT2 signal.

In one embodiment, the VTX signal (and the TX signal) may be ramped up to transfer charge from the PPD 901 to the FD1 node. The amount of charge transferred from the PPD 901 to the FD1 node may be a function of the level of the TX signal, and the ramping of the TX voltage may be a function of time. Thus, the charge transferred from the PPD 901 to the FD1 node may be a function of time. If, during the transfer of charge from the PPD 901 to the FD1 node, the second transistor 905 is turned off in response to the SPAD circuit 801 detecting an incoming photon, the transfer of charge from the PPD 901 to the FD1 node stops, and the amount of charge transferred to the FD1 node and the amount of charge remaining in the PPD 901 are both related to the TOF of the incoming photon. The transfer of charge from the PPD 901 to the FD1 node based on the TX signal and detection of incoming photos provides a single-ended-to-differential conversion of charge to time.

For the time-resolving sensor 800, the ratio expressed in Eq. (1) may be used to determine depth or range of an object, and is less sensitive to measurement-to-measurement variations if PIXOUT1+PIXOUT2 does not vary from measurement to measurement. In one embodiment, the VTX signal may ideally be linear, and may ideally be uniform throughout the different pixels of a TOF pixel array. In practice, however, the VTX signal that may be applied to the different pixels of a TOF pixel array may vary from pixel to pixel, thereby introducing an error in a range measurement that depends on the variation of the VTX signal from pixel to pixel, and may also vary from measurement-to-measurement.

In one embodiment, the first transistor 903, the second transistor 905, the third transistor 907, the fourth transistor 909, the fifth transistor 911, the sixth transistor 913, the seventh transistor 915, the eighth transistor 917, and the ninth transistor 919 may each be an n-type MOSFET or a p-type MOSFET; however any other suitable transistor may be used.

Figure 10:
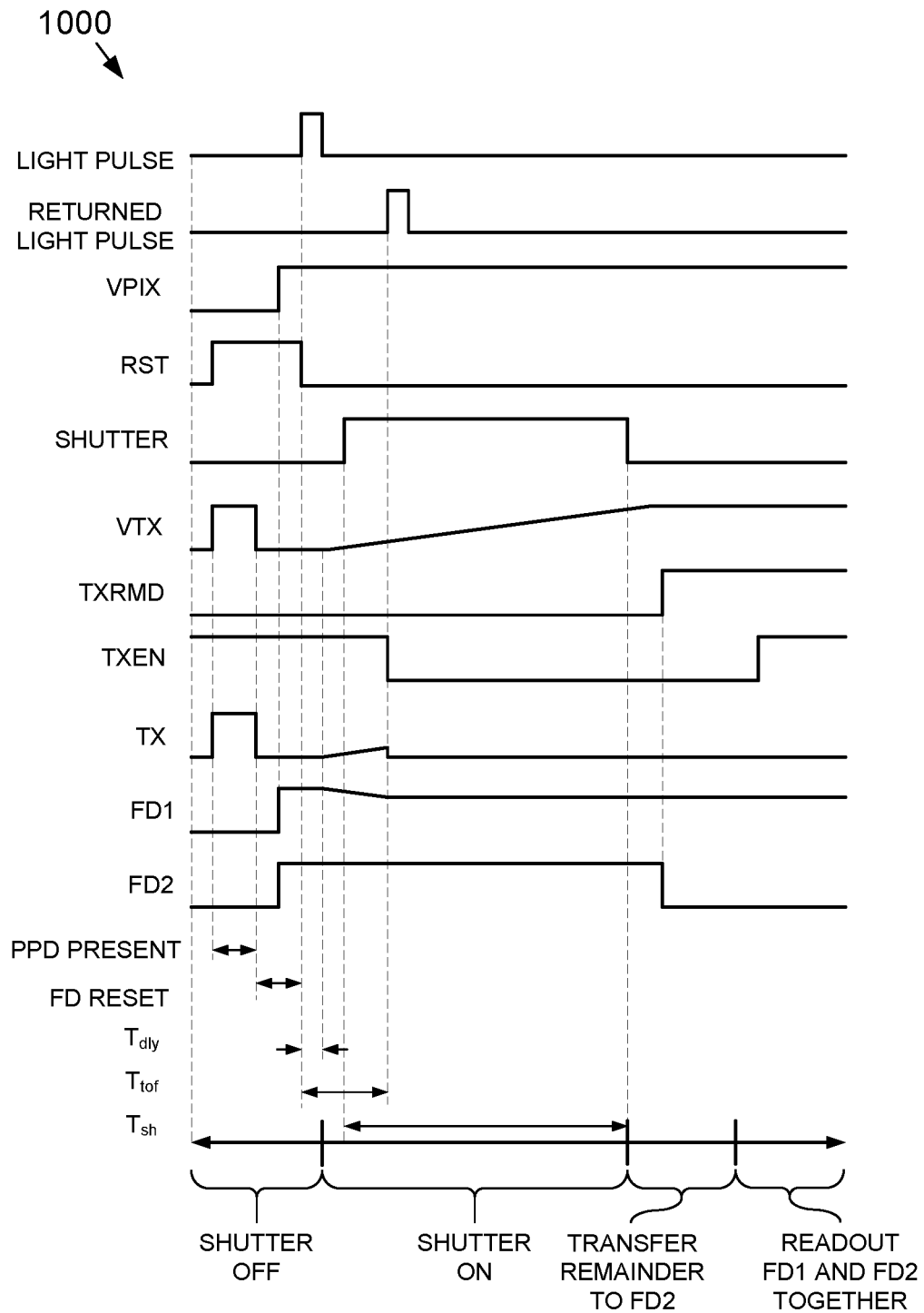
FIG. 10 depicts an example relative signal timing diagram for the time-resolving sensor of FIG. 8 according to the subject matter disclosed herein.

FIG. 10 depicts an example relative signal timing diagram 1000 for the time-resolving sensor 800 according to the subject matter disclosed herein. The signal timing diagram of FIG. 10 is very similar to the signal timing diagram of FIG. 7 and the similarities are described with reference to FIG. 7. The signal timing diagram of FIG. 10 differs by including a FD2 signal and that at the end of the Shutter On period, the remaining charge on the PPD 901 is transferred to the FD2 node by operation of the TXRMD signal. Additionally, the PIXOUT1 and PIXOUT2 signals may be readout simultaneously.

It should be noted that the second PPD circuit 805 relies on an invariant full-well capacity to determine a maximum range; however, practical implementations of the time-resolving sensor 800 may experience full-well variations for the PPD 901 based on thermal noise between different second PPD circuits 805. Additionally, the VTX signal may have different ramps (slopes) based on the location of a pixel in a pixel array. That is, the ramp (slope) of the VTX signal at a pixel may vary depending on how close the pixel is from the source of the VTX signal.

Figure 11:
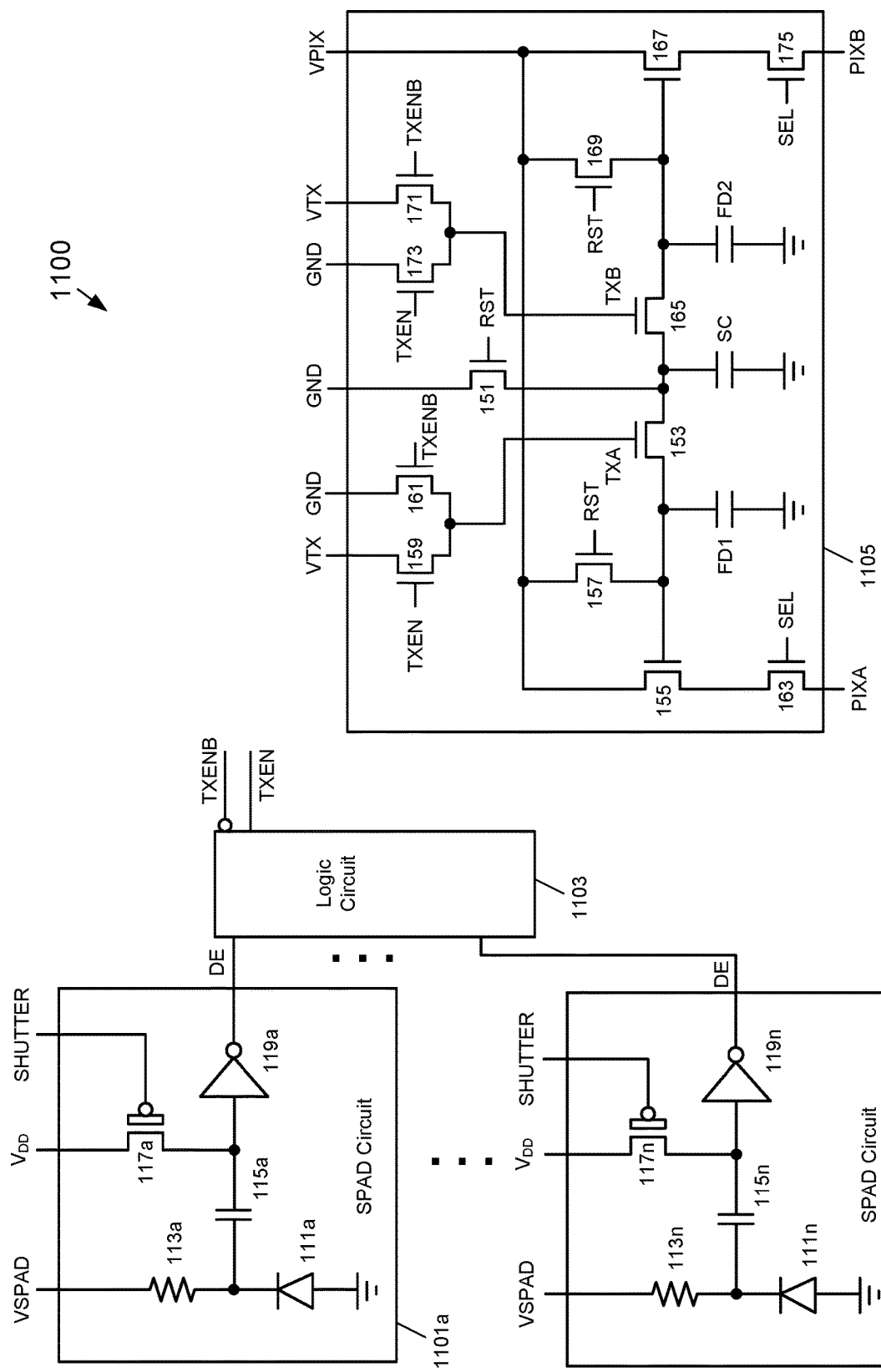
FIG. 11 depicts a block diagram of still another example embodiment of a time-resolving sensor according to the subject matter disclosed herein.

FIG. 11 depicts a block diagram of still another example embodiment of a time-resolving sensor 1100 according to the subject matter disclosed herein. The time-resolving sensor 110 may include one or more SPAD circuits 1101a-1101n, a logic circuit 1103, and a third PPD circuit 1105.

In one embodiment, each of the one or more SPAD circuits 1101 may include a SPAD 111, a resistor 113, a capacitor 115, a p-type MOSFET transistor 117 and a buffer 119. The SPAD 111 may include an anode connected to a ground potential, and a cathode. The resistor 113 may include a first terminal for receiving a VSPAD voltage and a second terminal connected to the cathode of the SPAD 111. In another embodiment, the positions of the SPAD 111 and the resistor 113 may be swapped. The SPAD 111 may respond to light. In response to receiving a photon, the SPAD 111 outputs a pulse signal that goes rapidly from the VSPAD voltage to below breakdown voltage, and then more gradually returns to the VSPAD voltage.

The capacitor 115 may include a first terminal connected to the cathode of the SPAD 111 and a second terminal. In an alternative embodiment, the capacitor 115 may be omitted. The p-type MOSFET 117 may include a first S/D terminal connected to the second terminal of the capacitor 115, a gate for receiving a SHUTTER signal, and a second S/D terminal for receiving a VPIX voltage ($V_{DD}$). The buffer 119 may include an input connected to the second terminal of the capacitor 115, and an inverting output, which may output the DE signal corresponding to the output of the SPAD circuit 1101. In an alternative embodiment, the buffer 117 may be noninverting.

The logic circuit 1103 may include inputs connected to the DE signal of each of the one or more SPAD circuit 1101a-1101n, and outputs a TXEN signal and a TXENB signal, which may be an inversion of the TXEN signal.

The third PPD circuit 1105 may include a capacitor device SC, a first transistor 151, a second transistor 153, a third transistor 155, a fourth transistor 157, a fifth transistor 159, a sixth transistor 161, a seventh transistor 163, an eighth transistor 165, a ninth transistor 167, a tenth transistor 169, an eleventh transistor 171, a twelfth transistor 173, and a thirteenth transistor 175.

The capacitor device SC may include a first terminal connected to a ground potential, and a second terminal. The capacitor device SC may store a charge in a manner that is similar to a capacitor. In one embodiment, the capacitor device may be a capacitor. In another embodiment, the capacitor device may be a PPD that may be covered so that it does not respond to light. In either embodiment, the capacitor device SC may be used as part of a time-to-charge converter.

The first transistor 151 may include a gate terminal connected to an RST signal, a first S/D terminal connected to a ground potential, and a second S/D terminal connected to the second terminal of the capacitor device SC.

The second transistor 153 may include a gate terminal connected to a TXA signal, a first S/D terminal connected to a first floating diffusion FD1 node, and a second S/D terminal connected to the second S/D terminal of the first transistor 151 and the second terminal of the capacitor device SC. The first floating diffusion FD1 node is represented in FIG. 11 with a capacitor symbol. There may be a parasitic capacitance between the FD1 node and ground, which is not indicated in FIG. 11. In one embodiment, a physical capacitance may also be connected between the FD1 node and ground.

The third transistor 155 may include a gate terminal connected to the FD1 node and the first S/D terminal of the second transistor 153, a first S/D terminal connected to a VPIX voltage, and a second S/D terminal. The third transistor 155 may operate to convert a charge on the FD1 node to a voltage at the second S/D terminal of the third transistor 155.

The fourth transistor 157 may include a gate terminal connected to the RST signal, a first S/D terminal connected to the VPIX voltage, and a second S/D terminal connected to the second S/D terminal of the first transistor 151 and the second terminal of the capacitor device SC.

The fifth transistor 159 may include a gate terminal connected to the TXEN signal, a first S/D terminal connected to a VTX signal, and a second S/D terminal connected to the gate terminal of the second transistor 153.

The sixth transistor 161 may include a gate terminal connected to the TXENB signal, a first S/D terminal connected to a ground potential, and a second S/D terminal connected to the gate terminal of the second transistor 153 and the second S/D terminal of the fifth transistor 159.

The seventh transistor 163 may include a gate terminal connected to an SEL signal, a first S/D terminal connected to the second S/D terminal of the third transistor 155, and a second S/D terminal connected to a pixel output line PIXA.

The eighth transistor 165 may include a gate terminal connected to a TXB signal, a first S/D terminal connected to a second floating diffusion FD2 node, and a second S/D terminal connected to the second S/D terminal of the first transistor 151, the second terminal of the capacitor device SC, and the second terminal of the second transistor 153. The second floating diffusion FD2 node is represented in FIG. 11 with a capacitor symbol. There may be a parasitic capacitance between the FD2 node and ground, which is not indicated in FIG. 11. In one embodiment, a physical capacitance may also be connected between the FD2 node and ground.

The ninth transistor 167 may include a gate terminal connected to the FD2 node and the first S/D terminal of the eighth transistor 165, a first S/D terminal connected to the VPIX voltage, and a second S/D terminal. The ninth transistor 167 may operate to convert a charge on the FD1 node to a voltage at the second S/D terminal of the ninth transistor 167.

The tenth transistor 169 may include a gate terminal connected to the RST signal, a first S/D terminal connected to the VPIX voltage, and a second S/D terminal connected to the second S/D terminal of the first transistor 151, the second terminal of the capacitor device SC, and the second S/D terminal of the eighth transistor 165.

The eleventh transistor 171 may include a gate terminal connected to the TXENB signal, a first S/D terminal connected to the VTX signal, and a second S/D terminal connected to the gate terminal of the eighth transistor 165.

The twelfth transistor 173 may include a gate terminal connected to the TXEN signal, a first S/D terminal connected to a ground potential, and a second S/D terminal connected to the gate terminal of the eighth transistor 165 and the second S/D terminal of the eleventh transistor 171.

The thirteenth transistor 165 may include a gate terminal connected to the SEL signal, a first S/D terminal connected to the second S/D terminal of the ninth transistor 167, and a second S/D terminal connected to a pixel output line PIXB.

Figure 12:
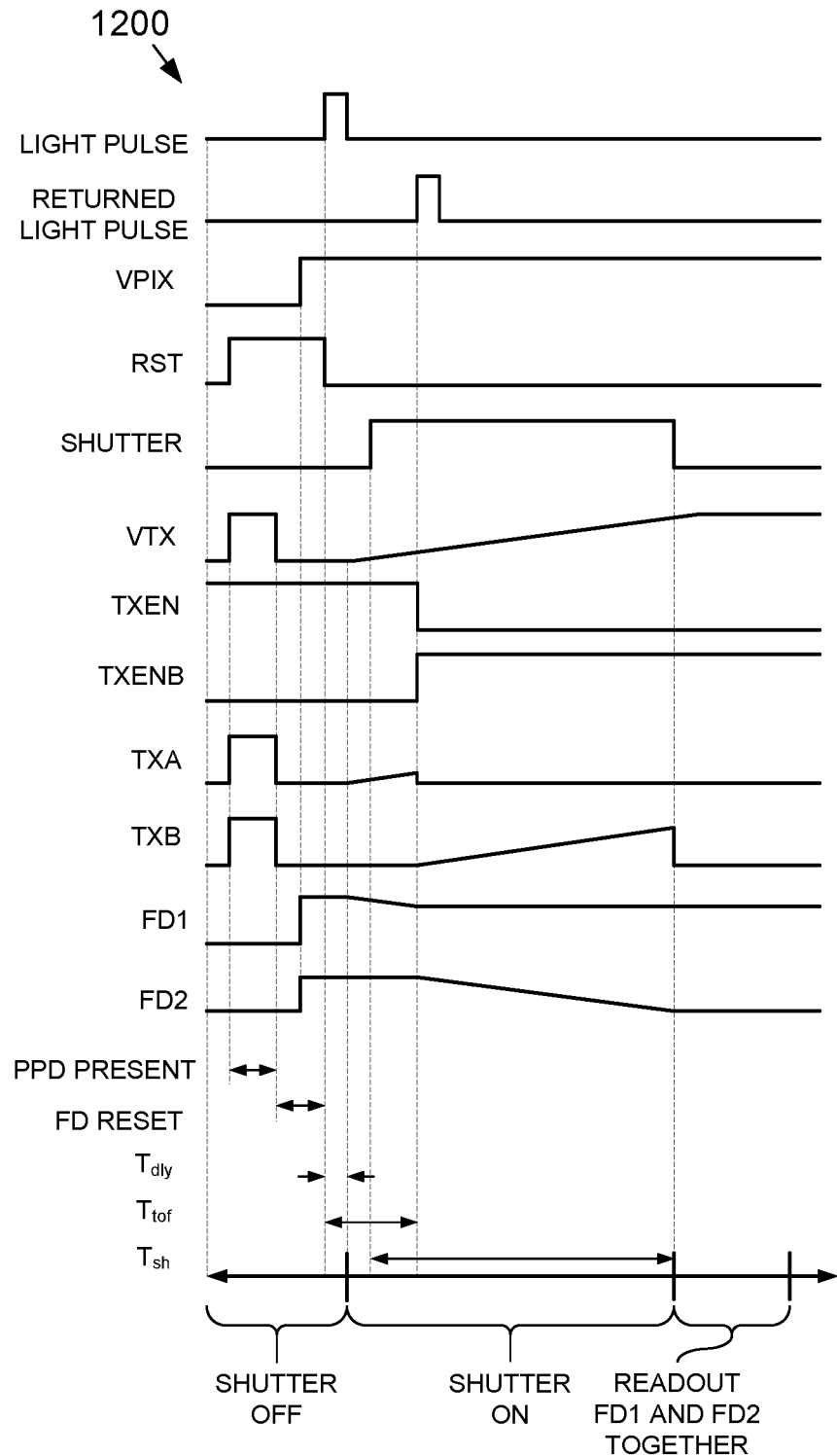
FIG. 12 depicts an example relative signal timing diagram for the time-resolving sensor of FIG. 11 according to the subject matter disclosed herein.

FIG. 12 depicts an example relative signal timing diagram 1200 for the time-resolving sensor 1100 according to the subject matter disclosed herein. The signal timing diagram of FIG. 12 is very similar to the signal timing diagram of FIGS. 7 and 10 and the similarities are described with reference to FIG. 7. The signal timing diagram of FIG. 12 differs from the signal time diagram of FIG. 10 by not including a TXRMD signal and a TX signal, but instead including a TXENB, a TXA signal and a TXB signal.

In the signal timing diagram of FIG. 12, the TXENB signal is an inversion of the TXEN signal. When the SHUTTER signal is active high, the TXEN signal is active and the VTX signal is passed through the fifth transistor 159, thereby making the TXA signal is active. The charge on the capacitor device SC is transferred through the second transistor 153 to the FD1 node. Meanwhile, the ground potential is passed through the twelfth transistor 173, which makes the TXB signal inactive.

When a detection event DE occurs, the TXEN signal becomes inactive and the TXENB signal becomes active. When the TXEN signal becomes inactive, the TXA signal also become inactive and charge is stopped from being transferred through the second transistor 153 from the capacitor device SC to the FD1 node. When the TXENB signal becomes active, the TXB signal becomes active and charge is transferred from the capacitor device SC through the eighth transistor 165 to the FD2 node.

When the SHUTTER signal ends, the TXB signal becomes inactive and charge is stopped from being transferred through the eighth transistor 165 from the capacitor device SC to the FD2 node. The respective voltages associated with the charges on the FD1 node and the FD2 node are read out from the PIXA and PIXB output lines.

It should be noted that variations in the slope of the VTX signal and variations in the capacitance of the capacitor device SC from pixel to pixel do not cause range measurement errors, as long as the second transistor 153 (TXA) and the eighth transistor 165 (TXB) operate in a linear mode during an active SHUTTER signal.

Figure 13:
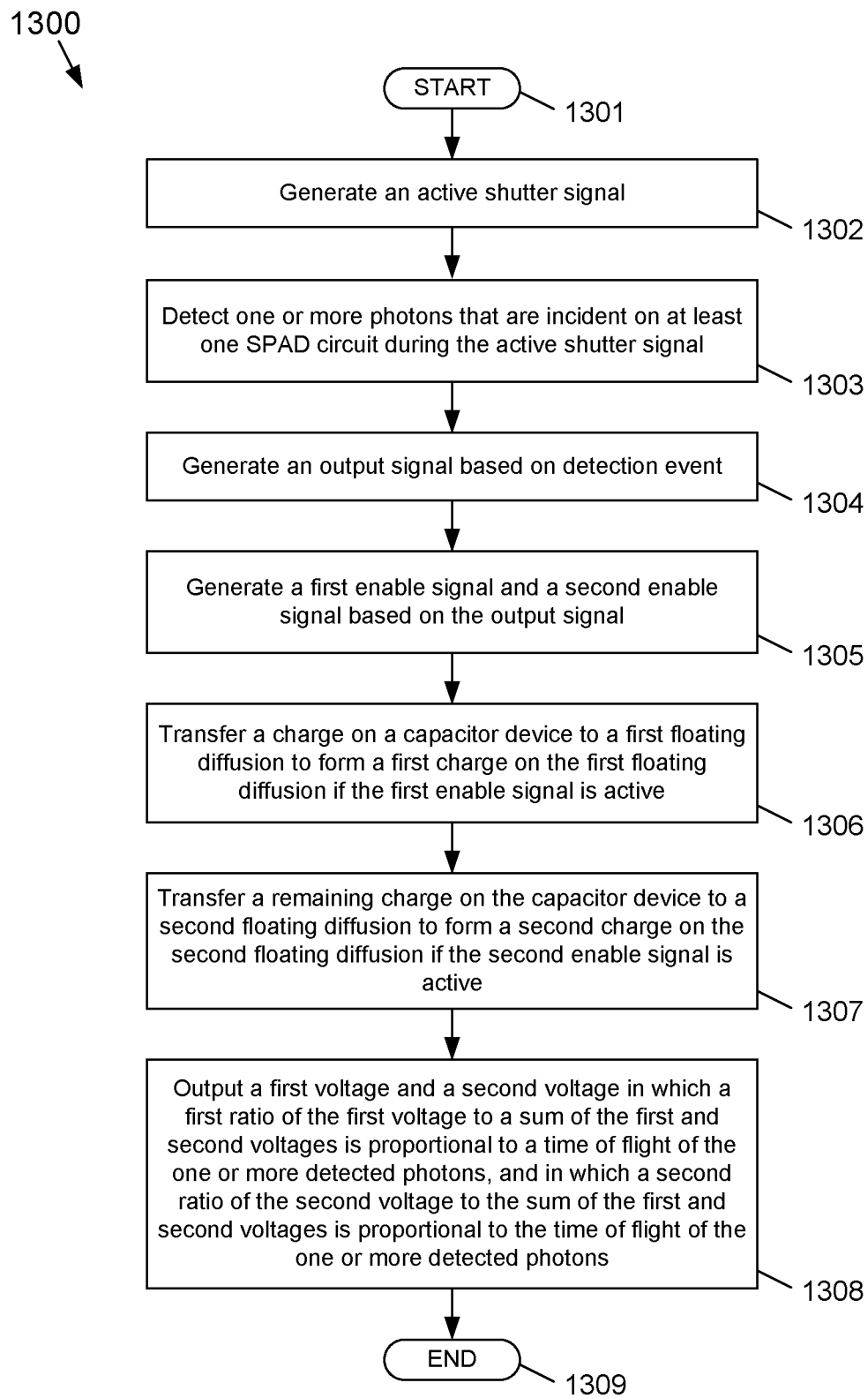
FIG. 13 depicts a flow diagram of a method to resolve time using the time resolving sensor of FIG. 11 according to the subject matter disclosed herein.

FIG. 13 depicts a flow diagram of a method 1300 to resolve time using the time resolving sensor 1100 according to the subject matter disclosed herein. The method starts at 1301. At 1302, an active shutter signal is generated. At 1303, one or more photons that are incident on at least one SPAD circuit 1101 are detected (a detection event DE) during the active shutter signal in which the one or more detected photons have been reflected from an object. At 1304, an output signal based on the detection event DE. At 1305, a first enable signal TXEN and a second enable signal TXENB are generated based on the output signal for the detection event DE. In one embodiment, the first enable signal becomes active in response to a beginning of the active shutter signal and becomes inactive in response to the output signal, and the second enable signal becomes active in response to the output signal and becomes inactive in response to an end of the active shutter signal.

At 1306, a charge on a capacitor device SC to a first floating diffusion FD1 node to form a first charge on the first floating diffusion FD1 node if the first enable signal is active. At 1307, a remaining charge on the capacitor device SC to a second floating diffusion FD2 node to form a second charge on the second floating diffusion FD2 node if the second enable signal is active. At 1308, a first voltage that is based on the first charge and a second voltage that is based on the second charge are output. A first ratio of the first voltage to a sum of the first and second voltages is proportional to a time of flight of the one or more detected photons, and a second ratio of the second voltage to the sum of the first and second voltages is proportional to the time of flight of the one or more detected photons. At 1309, the method ends.

In one embodiment, transferring the first and second charges further includes changing a drive signal VTX according to a ramp function in which the drive signal VTX begins to change in response to a beginning time of a light pulse from which the one or more detected photons are detected to the end of the active shutter signal. Additionally, transferring the charge on the capacitor device to the first floating diffusion to form the first charge on the first floating diffusion may be further based on a level of the drive signal when the first enable signal is active, and transferring the remaining charge on the capacitor device to the second floating diffusion to form the second charge on the second floating diffusion may be further based on the level of the drive signal when the second enable signal is active.

In another embodiment, the first ratio of the first voltage to the sum of the first and second voltages may be further proportional to the time of flight of the one or more detected photons minus a delay time. Similarly, the second ratio of the second voltage to the sum of the first and second voltages may be further proportional to the time of flight the one or more detected photons minus a delay time, the delay time comprising a time between a beginning of a transmission time of the light pulse to a time that the drive signal begins to change.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A differential time-to-charge converter (DTCC) circuit, comprising:
   a capacitive device;
   a first switching device coupled between the capacitive device and a first floating diffusion, the first switching device being responsive to a first enable signal to transfer a first charge on the capacitive device to the first floating diffusion, the first enable signal being active to indicate a beginning of an active shutter signal and being inactive in response to a detection of one or more photons that are incident on a first type of diode;
   a second switching device coupled between the capacitive device and a second floating diffusion, the second switching device being responsive to a second enable signal to transfer a remaining charge on the capacitive device to the second floating diffusion, the second enable signal being in active in response to detection of the one or more photons that are incident on the first type of diode and being inactive in response to an end of the active shutter signal; and
   an output circuit to output a first voltage that is based on the first charge on the first floating diffusion and a second voltage that is based on the remaining charge on the second floating diffusion, a first ratio of the first voltage to a sum of the first voltage and the second voltage being proportional to a time of flight of the one or more detected photons, and a second ratio of the second voltage to the sum of the first voltage and the second voltage being proportional to the time of flight of the one or more detected photons.

2. The DTCC circuit of claim 1, further comprising a drive signal that changes according to a ramp function, the drive signal beginning to change in response to a beginning time of a light pulse from which the one or more photons are detected to the end of the active shutter signal, the drive signal controlling the first switching device when the first enable signal is active and controlling the second switching device when the second enable signal is active.

3. The DTCC circuit of claim 2, wherein the first ratio of the first voltage to the sum of the first voltage and the second voltage is further proportional to the time of flight of the one or more photons minus a delay time and the second ratio of the second voltage to the sum of the first voltage and the second voltage is further proportional to the time of flight of the one or more photons minus a delay time, the delay time comprising a time between a beginning of a transmission time of the light pulse to a time that the drive signal begins to change.

4. The DTCC circuit of claim 3, wherein the one or more photons are reflected from an object.

5. The DTCC circuit of claim 3, wherein the capacitive device comprises a pinned photodiode.

6. The DTCC circuit of claim 5, wherein the first and second switching devices comprise transistors.

7. The DTCC circuit of claim 6, wherein the DTCC comprises part of a three-dimensional imaging system.

8. A three-dimensional (3D) imaging system, comprising:
   an image sensor that detects one or more photons that are incident on a first type of diode, the one or more photons being reflected from an object; and
   at least one time-resolving sensor, each time-resolving sensor comprising:
   a differential time-to-charge converter (DTCC) circuit, comprising:
   a capacitive device;
   a first switching device coupled between the capacitive device and a first floating diffusion, the first switching device being responsive to a first enable signal to transfer a first charge on the capacitive device to the first floating diffusion, the first enable signal being active to indicate a beginning of an active shutter signal and being inactive in response to a detection of one or more photons that are incident on a first type of diode;

a second switching device coupled between the capacitive device and a second floating diffusion, the second switching device being responsive to a second enable signal to transfer a remaining charge on the capacitive device to the second floating diffusion, the second enable signal being in active in response to detection of the one or more photons that are incident on the first type of diode and being inactive in response to an end of the active shutter signal; and an output circuit to output a first voltage that is based on the first charge on the first floating diffusion and a second voltage that is based on the remaining charge on the second floating diffusion, a first ratio of the first voltage to a sum of the first voltage and the second voltage being proportional to a time of flight of the one or more detected photons, and a second ratio of the second voltage to the sum of the first voltage and the second voltage being proportional to the time of flight of the one or more detected photons.

9. The 3D-imaging system of claim 8, further comprising a drive signal that changes according to a ramp function, the drive signal beginning to change in response to a beginning time of a light pulse from which the one or more photons are detected to the end of the active shutter signal, the drive signal controlling the first switching device when the first enable signal is active and controlling the second switching device when the second enable signal is active.

10. The 3D-imaging system of claim 9, wherein the first ratio of the first voltage to the sum of the first voltage and the second voltage is further proportional to the time of flight of the one or more photons minus a delay time and the second ratio of the second voltage to the sum of the first voltage and the second voltage is further proportional to the time of flight of the one or more photons minus a delay time, the delay time comprising a time between a beginning of a transmission time of the light pulse to a time that the drive signal begins to change.

11. The 3D-imaging system of claim 10, wherein the capacitive device comprises a capacitor.

12. The 3D-imaging system of claim 10, wherein the capacitive device comprises a pinned photodiode.

13. The 3D-imaging system of claim 12, wherein the first and second switching devices comprise transistors.

14. The 3D-imaging system of claim 10, wherein the first type of diode is a single-photon avalanche diode (SPAD).

* * * * *